US009494313B2

(12) United States Patent
Okazaki et al.

(10) Patent No.: US 9,494,313 B2
(45) Date of Patent: Nov. 15, 2016

(54) DEVICE AND METHOD FOR MANUFACTURING SEMI-CARBONIZED FUEL OF BIOMASS, AND POWER GENERATION SYSTEM USING SEMI-CARBONIZED FUEL

(75) Inventors: Hirofumi Okazaki, Tokyo (JP); Akihito Orii, Tokyo (JP); Tetsuma Tatsumi, Tokyo (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 442 days.

(21) Appl. No.: 14/110,340

(22) PCT Filed: Apr. 6, 2012

(86) PCT No.: PCT/JP2012/059440
§ 371 (c)(1),
(2), (4) Date: Oct. 7, 2013

(87) PCT Pub. No.: WO2012/137895
PCT Pub. Date: Oct. 11, 2012

(65) Prior Publication Data
US 2014/0026791 A1 Jan. 30, 2014

(30) Foreign Application Priority Data
Apr. 8, 2011 (JP) ................................ 2011-085912

(51) Int. Cl.
*F23B 30/00* (2006.01)
*C10B 49/02* (2006.01)
(Continued)

(52) U.S. Cl.
CPC .............. *F23B 7/002* (2013.01); *C10B 49/02* (2013.01); *C10B 53/02* (2013.01); *C10B 57/10* (2013.01);
(Continued)

(58) Field of Classification Search
CPC ........... F23B 5/04; F23B 10/02; F23C 10/005; F23G 5/04; F23G 5/05; F23G 2201/10;
(Continued)

(56) References Cited

U.S. PATENT DOCUMENTS 3,668,077 A * 6/1972 Ban ..................... F23G 5/0276
110/228
3,954,069 A * 5/1976 Loken .................... F23G 7/001
110/221
(Continued)

FOREIGN PATENT DOCUMENTS

CN 1814699 A 8/2006
EP 1 969 099 A1 9/2008
(Continued)

OTHER PUBLICATIONS

International Search Report (PCT/ISA/210) with English translation dated May 22, 2012 (Four (4) pages).
European Search Report dated Feb. 20, 2015 (Eight (8) pages).

*Primary Examiner* — David J Laux
(74) *Attorney, Agent, or Firm* — Crowell & Moring LLP

(57) ABSTRACT

Provided are a device and a method for manufacturing a semi-carbonized fuel of a biomass that does not require an external heat source and is capable of suppressing adhesion of tar, condensed water, or the like to a pipe. The device includes a drying device for heating and drying a biomass, a pyrolysis device for decomposing the dried biomass, and a combustion device for supplying heat to the drying device and the pyrolysis device. The pyrolysis device is supplied with a part of a combustion exhaust gas generated in the combustion device, directly mixes the supplied combustion exhaust gas and the biomass to heat and pyrolytically decompose the biomass, and supplies a mixed gas of a generated pyrolysis gas and the combustion exhaust gas to the combustion device. The combustion device is supplied
(Continued)

with an air for combustion, combust the supplied mixed gas, and generate the combustion exhaust gas.

15 Claims, 3 Drawing Sheets

(51) Int. Cl.
 C10L 9/08 (2006.01)
 C10B 57/10 (2006.01)
 C10B 53/02 (2006.01)
 C10L 5/44 (2006.01)

(52) U.S. Cl.
 CPC .. *C10L 5/44* (2013.01); *C10L 9/08* (2013.01); *C10L 9/083* (2013.01); *Y02E 50/10* (2013.01); *Y02E 50/14* (2013.01); *Y02E 50/15* (2013.01); *Y02E 50/30* (2013.01)

(58) Field of Classification Search
 CPC ............ F23G 2201/101; F23G 2201/40; F23G 2202/103; F23G 2203/503
 See application file for complete search history.

(56) References Cited

U.S. PATENT DOCUMENTS

| | | | |
|---|---|---|---|
| 4,167,909 A * | 9/1979 | Dauvergne | F23B 5/04 110/207 |
| 4,303,415 A * | 12/1981 | Summers | C10J 3/00 201/44 |
| 4,311,103 A * | 1/1982 | Hirose | C02F 11/10 110/221 |
| 2002/0144636 A1 | 10/2002 | Tsumura et al. | |
| 2009/0084029 A1 * | 4/2009 | Bergman | C10B 53/02 44/605 |

FOREIGN PATENT DOCUMENTS

| | | |
|---|---|---|
| JP | 2001-072979 A | 3/2001 |
| JP | 2002-018416 | 1/2002 |
| JP | 2003-096464 A | 4/2003 |
| JP | 2004-043587 A | 2/2004 |
| JP | 2005-239907 A | 9/2005 |
| JP | 2005-319372 A | 11/2005 |
| JP | 2008-013377 A | 1/2008 |
| JP | 2009-091496 A | 4/2009 |
| JP | 2009-522097 A | 6/2009 |
| WO | WO 2005/056723 A1 | 6/2005 |
| WO | WO 2007/078199 A1 | 7/2007 |

* cited by examiner

DEVICE AND METHOD FOR MANUFACTURING SEMI-CARBONIZED FUEL OF BIOMASS, AND POWER GENERATION SYSTEM USING SEMI-CARBONIZED FUEL

FIELD OF THE INVENTION

The present invention relates to a device and a method of manufacturing semi-carbonized fuel using biomass, and a power generation system using the semi-carbonized fuel.

BACKGROUND OF THE INVENTION

The biomass consisting of plant wastes such as chaff, straw, and thinned wood generated in agriculture, forestry, and so on, and waste wood contain large amounts of fibrous materials such as cellulose or lignin as the constituents thereof. Further, the water content of the biomass is generally about 20% or higher, which is high compared to other fuels such as coal.

In recent years, the application of the biomass consisting of the plant wastes (hereinafter simply described as "biomass") to heat sources such as a boiler has been considered as an alternative fuel for solid fuels typified by coal. Since $CO_2$ derived from the biomass is fixed again by plants, the use of the biomass as fuel can be deemed $CO_2$ free. Further, due to simplification of the treatment of wastes and reduction in the usage of coal, the emission of $CO_2$ can be reduced.

There are two main problems in the use of the biomass as the solid fuel. One is that the water content is high. If the water content is high, there are disadvantages of decrease in calorific value, increase in transportation cost, and further, increase in possibility of spontaneous combustion due to the progression of microbial actions. Therefore, the biomass is not suitable for long-distance transportation and long-term storage.

Another problem is that the crushability is poor since the major constituent is formed of fibrous materials. In general, in crushing coal, there is used a method in which coal is subjected to compression milling with rollers or balls formed of a hard material. The method of crushing coal under pressure is suitable for mass processing, and is deemed economical. However, since the biomass is soft compared to coal and contains large amounts of fibrous materials, the pulverization thereof is difficult to be achieved by the compression milling method described above, and the crushing efficiency indicating the degree of atomization with respect to the required power is low. Therefore, it has been difficult to achieve mass pulverization similarly to coal. Further, in the case of combusting the biomass with coal, the amount of the biomass allowed to be put into the crusher for crushing coal stays in a level of several percents.

As one of methods of overcoming the problems described above, there is a so-called semi-carbonization method, namely a method of thermally decomposing the biomass in an atmosphere with the temperature of about 300° C. and the oxygen of less than 10% to thereby manufacture semi-carbonized fuel. An example of the semi-carbonization method is described in Patent Document 1 and Patent Document 2.

In this method, by thermally decomposing the biomass in the atmosphere with a low oxygen concentration and the temperature of about 300° C., the moisture is removed, and the fibrous materials consisting of lignin or cellulose is decomposed. Therefore, the solid fuel after the thermal decomposition is decreased in water content and is thus increased in calorific value per unit mass. Since the fibrous materials are decomposed into the component mainly consisting of carbon, the compression milling is easy. Further, due to the thermal decomposition at low temperature of around 300° C., volatile components partially remain in the solid fuel, and thus, the ignition property is equivalent to coal.

DOCUMENTS ON PRIOR ARTS

Patent Document

Patent Document 1: JP2005-239907
Patent Document 2: WO2005/056723

DISCLOSURE OF THE INVENTION

Problems to be Solved by the Invention

The methods of manufacturing semi-carbonized fuel of the biomass described in Patent Documents 1 and 2 are each characterized in the heat source when thermally decomposing the biomass.

In the technology described in Patent Document 1, an exhaust gas generated in a cement firing equipment is used to ensure the heat source necessary for the semi-carbonization. In other words, it is premised that the cement firing equipment disposed outside a device for manufacturing the semi-carbonized fuel is used as a combustion equipment, and the high-temperature exhaust gas generated in the combustion equipment is used. Disposing the heat source outside the device for manufacturing the semi-carbonized fuel as described above increases the scale and the manufacturing cost of the device, and thus causes a significant restriction on the installation of the device.

In the technology described in Patent Document 2, a pyrolysis gas of the biomass itself is used as the heat source necessary for the semi-carbonization. Since the gas generated by the biomass is used, external heat supply can be reduced, and thus the operation cost of the device for manufacturing the semi-carbonized fuel can be reduced. Further, unlike the technology described in Patent Document 1, the device for manufacturing the semi-carbonized fuel is not subject to the restriction on the installation of the heat source.

However, in the technology described in Patent Document 2, in order to use the pyrolysis gas with a high calorific value, the pyrolysis gas is partially circulated in the device as a heat carrier. When the temperature falls, the component of the pyrolysis gas is condensed and then adheres to a pipe and so on of the device as tar or condensed water. The tar attached to the pipe is an obstacle to the operation because removal of the tar requires stopping the device for a long period of time.

Further, when the tar, the condensed water, or the like adheres to a partition wall, a heat-transfer surface, or the pipe of the device, the components included in these attached matters adhere to the partition wall, the heat-transfer surface, or the pipe, growing to narrow or choke a flow path, which is an obstacle to the operation.

The object of the present invention is to provide a device and a method for manufacturing a semi-carbonized fuel of a biomass, which do not require providing an external heat source and are capable of suppressing the adhesion of tar, condensed water, and so on to the pipe.

Means for Solving the Problem

The device for manufacturing a semi-carbonized fuel of a biomass according to the present invention has a feature described below.

A device for manufacturing a semi-carbonized fuel of a biomass includes a drying device configured to heat and dry a biomass; a pyrolysis device configured to pyrolytically decompose the biomass dried by the drying device; and a combustion device configured to supply heat to the drying device and the pyrolysis device for heating. The pyrolysis device is configured to be supplied with a part of a combustion exhaust gas generated in the combustion device, directly mix the supplied combustion exhaust gas and the biomass to heat and pyrolytically decompose the biomass, and supply a mixed gas of a generated pyrolysis gas and the combustion exhaust gas used for heating to the combustion device. The combustion device is configured to be supplied with an air for combustion, combust the supplied mixed gas, and generate the combustion exhaust gas.

Advantageous Effects of the Invention

The device and the method for manufacturing a semi-carbonized fuel of a biomass according to the present invention do not require an external heat source and are capable of suppressing adhesion of tar, condensed water or the like to a pipe.

DESCRIPTION OF EMBODIMENTS

Figure 1:
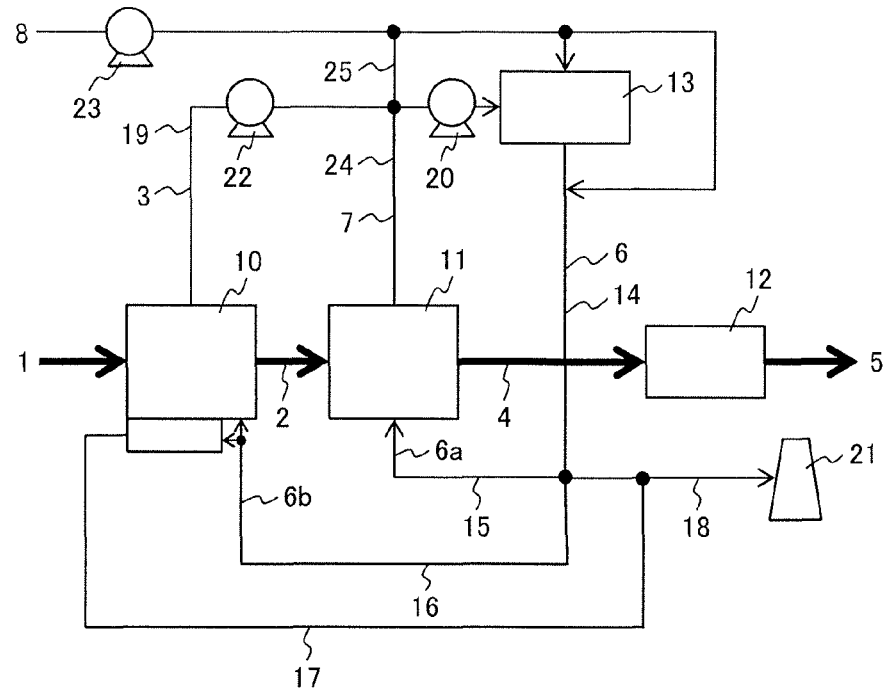
FIG. 1 is a configuration diagram of a device for manufacturing a semi-carbonized fuel of a biomass according to a first embodiment of the present invention.

A major feature of the device and the method of manufacturing the semi-carbonized fuel of the biomass according to the present invention will be described. Hereinafter, the device for manufacturing the semi-carbonized fuel of the biomass is simply described as a "manufacturing device." Further, the method for manufacturing the semi-carbonized fuel of the biomass is simply described as a "manufacturing method."

The manufacturing device according to the present invention includes a drying device for heating and drying the biomass consisting of plant wastes such as chaff, straw, thinned wood, and waste wood (hereinafter described as "raw biomass"), a pyrolysis device for thermally decomposing the biomass dried by the drying device (hereinafter described as "dried biomass"), and a combustion device for supplying the drying device and the pyrolysis device with heat for heating.

The pyrolysis device is supplied with a part of a combustion exhaust gas (hereinafter described as an "exhaust gas") generated in the combustion device. The pyrolysis device directly mixes the supplied exhaust gas with the dried biomass to thereby heat and thermally decompose the dried biomass. A mixed gas of the pyrolysis gas generated by the thermal decomposition of the dried biomass and the exhaust gas having used for heating (hereinafter simply described as a "mixed gas") is supplied to the combustion device and then burns.

The combustion device is supplied with air for combustion, combusts the supplied mixed gas, and then generates the exhaust gas. It is also possible to use a combustor having a catalytic component supported on the surface.

It is preferable for the drying device to supply the combustion device with a gas component (hereinafter described as a "separated gas in drying") generated when drying the raw biomass.

Preferably, the device for manufacturing the semi-carbonized fuel of the biomass includes an ejector device for supplying the mixed gas from the pyrolysis device to the combustion device. The ejector device uses at least one of the separated gas in drying and the air for combustion as a drive source.

More preferably, the device for manufacturing the semi-carbonized fuel of the biomass includes a plurality of combustion devices. Each of the combustion devices is supplied with the mixed gas and the air for combustion. The exhaust gas generated in a part of the combustion devices is supplied to the pyrolysis device, while the exhaust gas generated in the rest of the combustion devices is supplied to the drying device. On this occasion, it is desirable to set the oxygen concentration of the exhaust gas supplied to the pyrolysis device to be lower than the oxygen concentration of the exhaust gas supplied to the drying device.

In the manufacturing device and the manufacturing method according to the present invention, there is no need to externally dispose a heat source (a combustion device) since the biomass itself (the pyrolysis gas of the biomass) is used as the heat source necessary for the semi-carbonization of the biomass. The pyrolysis of the biomass is normally performed in an atmosphere with the temperature of about 300° C. and the oxygen concentration of no higher than 10%. The manufacturing device and the manufacturing method according to the present invention employ a direct-heating method of directly mixing the dried biomass and the exhaust gas with each other inside the pyrolysis device to thereby heat the dried biomass. The direct-heating method is high in heat-transfer efficiency compared to an indirect-heating method using another heat-transfer medium, and can reduce the heat transfer area or the capacity of the pyrolysis device. Further, the thermal efficiency of the direct-heating method is high because the heat is hard to be released.

A part of the pyrolysis components of the biomass are low in vapor pressure, and are condensed into a liquid or a solid, namely so-called tar or condensed water, as the temperature drops. When the tar or the condensed water adheres to a partition wall or a heat-transfer surface, the components included in these attached matters adhere to the partition wall, the heat-transfer surface, or the pipe, and then grow to narrow or choke a flow path, which is an obstacle to the operation. By adopting the direct-heating method, it is possible to suppress the adhesion of the tar and the condensed water, and thus it is difficult for the obstacle to the operation to occur since the area or the capacity of the heat-transfer surface where the temperature is apt to drop can be reduced, and the length of the pipe can also be decreased.

Further, the pyrolysis gas generated in the pyrolysis device is fed to the combustion device together with the exhaust gas and then combusted. Therefore, the use of other fuels can be reduced in the combustion device, and thus, the fuel cost can be reduced.

The mixed gas supplied from the pyrolysis device to the combustion device includes the exhaust gas and is therefore low in calorific value. In the case of adopting a catalytic combustion method of using the combustor having the catalytic component supported on the surface as the combustion device, the combustion reaction can be promoted for the mixed gas with the low calorific value due to the catalytic action, which is desirable for stable combustion. Further, it is known that in general, the component exerting the catalytic action of the catalyst vaporizes or reacts, and thus, the activity is degraded when the temperature rises to a high level equal to or higher than 1000° C. The combustion device in the manufacturing device and the manufacturing method according to the present invention combusts the mixed gas including the exhaust gas and low in calorific value, and is therefore hard to generate a high-temperature part equal to or higher than 1000° C. on the surface of the catalyst, and is therefore suitable for the catalytic combustion method.

Further, the separated gas in drying exhausted from the drying device is composed mostly of the moisture separated from the biomass, and includes a combustible gas, an odor component, and so on with high vapor pressure. By supplying the separated gas in drying to the combustion device, the odor component can be decomposed due to the combustion reaction. Further, the reaction heat of the combustible gas can be efficiently used.

In the manufacturing device according to the present invention, it is desirable to use an ejector device using air or the like as the drive source. In the case of using the ejector device, a rotating section such as an air blower is not required to feed the mixed gas to the combustion device. Therefore, there is no part where the mixed gas contacts a solid substance, except the partition wall constituting the flow path and the ejector device.

As described above, when the tar or the condensed water adheres to the partition wall and so on, there occurs an obstacle to the operation of the manufacturing device such as narrowing or choke of the flow path. When the rotating section such as the air blower exists in the manufacturing device, if the tar or the condensed water adheres to the rotating section, a vibration or the like occurs to thereby provide a further harmful influence. Further, the rotating section generally needs to be cooled, and therefore, a special cooling mechanism is necessary to flow the mixed gas with the temperature of about 300° C.

In the manufacturing device according to the present invention, because the rotating section is eliminated from the flow path of the mixed gas by using the ejector device, it is possible to inhibit the tar or the condensed water from adhering to the manufacturing device by keeping the partition wall constituting the flow path and the ejector device warm to thereby prevent the tar and the condensed water from adhering to the partition wall. Further, the air used as the drive source of the ejector device is used in the combustion device as a combustion supporting gas for the mixed gas. Since the mixture of the air and the mixed gas is promoted in the ejector device, it is possible to inhibit localized high-temperature from occurring inside the combustion device.

In the manufacturing device and the manufacturing method according to the present invention, it is desirable to include a plurality of combustion devices. In the plurality of combustion devices, the oxygen concentration of the exhaust gas is varied, and the temperature of the exhaust gas is changed.

The exhaust gas low in oxygen concentration has a small amount of surplus air, and is high in temperature. Therefore, even when the mixed gas low in calorific value is used as the fuel, the temperature of the exhaust gas from the combustion device is as high as about 600° C. if the oxygen concentration is low, which is the temperature suitable to be supplied to the pyrolysis device. Further, since the oxygen concentration is low, the possibility of incurring an obstacle to the operation is low, such as abnormal combustion of the raw biomass in the inside of the pyrolysis device.

Further, the amount of the exhaust gas high in oxygen concentration can be increased although the temperature is low. Therefore, it is suitable for the drying device requiring a heat source with the temperature in a range of about 100 to 200° C. In particular, when the exhaust gas is supplied to an external-heating drying device such as a rotary kiln, the exhaust gas after the heat transfer being discharged out of the manufacturing device from a chimney, the drop in temperature is reduced since the gas amount of the exhaust gas is large. Therefore, the corrosion of the materials of the pipe, the drying device and the like due to the condensation of the moisture in the exhaust gas can be suppressed.

Further, an unburnt combustible content included in the exhaust gas is apt to react with oxygen since the exhaust gas discharged from the manufacturing device is high in oxygen concentration. The unburnt combustible content discharged from the manufacturing device can be reduced because the unburnt combustible content included in the exhaust gas is decreased due to the reaction with oxygen.

First Embodiment

Hereinafter, a device for manufacturing a semi-carbonized fuel of a biomass according to the first embodiment of the present invention will be described.

FIG. 1 is a configuration diagram of the device for manufacturing the semi-carbonized fuel of the biomass according to the first embodiment. The manufacturing device includes a drying device 10, a pyrolysis device 11, a pellet manufacturing device 12, a combustion device 13, and a chimney 21 as major component devices. These devices are connected to each other by ducts 14 to 19, 24, and 25. In FIG. 1, out of the lines connecting the devices, thick lines indicate the flow of solid materials originating from the raw biomass, and thin lines indicate the flow of gas components such as air and the exhaust gas.

Raw biomass 1 composed of plant wastes such as chaff, straw, thinned wood, and waste wood is heated and dried in the drying device 10 into dried biomass 2 from which moisture is separated, and a gas component (hereinafter described as a "separated gas in drying") 3 generated when drying the raw biomass. The dried biomass 2 is heated in the pyrolysis device 11 in the atmosphere with the temperature of about 300° C. and the oxygen concentration of no higher than 10% and is thus pyrolytically decomposed, and thus a so-called semi-carbonization process is performed.

Biomass after the semi-carbonization process (hereinafter described as "semi-carbonized fuel") 4 generally has moisture of no higher than 5%, and the calorific value equivalent to coal. Therefore, the deterioration due to microorganisms is hard to occur during a long-term storage and the transportation coast is also low compared to the raw biomass 1. Further, in the semi-carbonization process, the fiberous materials such as lignin or cellulose as a component of the biomass is decomposed into a component mainly consisting of carbon. The semi-carbonized fuel 4 is easy to be crushed with pressure similarly to coal, and the crushability is enhanced, and the crushing efficiency equivalent to coal is achieved. Further, due to the thermal decomposition at low temperature of around 300° C., volatile components partially remain in the solid fuel, and thus, the ignition property is equivalent to coal. Therefore, the semi-carbonized fuel 4 can be used as a heat source of a boiler and so on similarly to coal.

In general, the semi-carbonized fuel 4 in a powder form is processed to be a cubic pellet (hereinafter described as "semi-carbonized pellet fuel") 5 with a size of several centimeters in the pellet manufacturing device 12 in order to improve the handling property, and then shipped from the manufacturing device.

As the heat source of the drying device 10 and the pyrolysis device 11, a combustion exhaust gas (hereinafter simply described as an "exhaust gas") 6 generated in the combustion device 13 is used. The combustion device 13 is connected to the drying device 10 and the pyrolysis device 11 via the ducts 14 to 16, 19, and 24. The exhaust gas 6 is divided into an exhaust gas 6a supplied from the combustion device 13 to the pyrolysis device 11 via the ducts 14, 15, and an exhaust gas 6b supplied from the combustion device 13 to the drying device 10 via the ducts 14, 16.

In the pyrolysis device 11, the exhaust gas 6a and the dried biomass 2 are directly mixed with each other. The dried biomass 2 is heated by the exhaust gas 6a, and is pyrolytically decomposed to generate the pyrolysis gas. The pyrolysis gas and the exhaust gas 6a are discharged from the pyrolysis device 11 as a mixed gas 7.

The mixed gas 7 of the pyrolysis gas and the exhaust gas 6a is supplied to the combustion device 13 via the duct 24 and an air blower 20, and is the heat source of the combustion device 13. By using the pyrolysis gas generated from the biomass (the dried biomass 2) as a heat source of the combustion device 13, the usage of other fuel can be reduced, and thus, the manufacturing cost of the semi-carbonized pellet fuel 5 as a product can be suppressed. On this occasion, depending on the supply of the exhaust gas 6a, the calorific value of the mixed gas 7 is about 4 MJ/m$^3$N, which is low compared to natural gas (lower calorific value of about 40 MJ/m$^3$N).

A large part of the exhaust gas 6b supplied to the drying device 10 is supplied to the outside of the drying device 10, and is made to exchange the heat with the raw biomass 1 using the indirect heat transfer which exchanges the heat across the partition wall. By the heat exchange using the indirect heat transfer, the gas amount of the separated gas in drying 3 can be reduced. Further, it is desirable that a part of the exhaust gas 6b supplied to the drying device 10 is supplied to the inside of the drying device 10. By supplying the exhaust gas 6b, it is possible to decrease the oxygen concentration in the drying device 10 to thereby inhibit an obstacle to the operation from occurring, such as spontaneous combustion.

The exhaust gas 6b, which has been made to exchange the heat in the drying device 10, passes through the ducts 17, 18, and is then discharged from the chimney 21 to the outside of the manufacturing device. Further, it is also possible for a part of the exhaust gas 6 generated in the combustion device 13 to be directly discharged from the chimney 21 through the duct 18.

The separated gas in drying 3 generated in the drying device 10 is mostly composed of the moisture generated from the raw biomass 1, and is partially composed of the pyrolysis component high in vapor pressure and the odor component. Therefore, it is desirable that the separated gas in drying 3 is fed to the combustion device 13 via the duct 19 and air blowers 22, 20, and is then combusted. By combusting the separated gas in drying 3, the odor component can be decomposed using the combustion heat of the pyrolysis component.

It should be noted that, not shown in the manufacturing device shown in FIG. 1, it is also possible to dispose a gas cooler in the middle of the duct 19 to thereby remove a part of the moisture in the separated gas in drying 3. By removing the moisture from the separated gas in drying 3, the combustion temperature in the combustion device 13 can be raised.

The combustion device 13 is also supplied with air for combustion 8. The air for combustion 8 is raised in pressure by an air blower 23, and is partially fed to the air blower 20 via the duct 25, and is partially fed to the combustion device 13 and the duct 14. By feeding the air for combustion 8 to the duct 14 at the downstream of the combustion device 13, it is possible to regulate the temperature of the exhaust gas 6.

The manufacturing device of the first embodiment employs a direct-heating method of directly mixing the dried biomass 2 and the exhaust gas 6 with each other inside the pyrolysis device 11 to thereby heat the dried biomass 2. The direct-heating method is high in heat-transfer efficiency compared to an indirect-heating method using another heat-transfer medium, and can reduce the heat transfer area or the capacity of the pyrolysis device. Further, the thermal efficiency of the direct-heating method is high because the heat is hard to be released.

A part of the pyrolysis components of the biomass are low in vapor pressure, and are condensed into a liquid or a solid, namely so-called tar or condensed water, as the temperature drops. When the tar or the condensed water adheres to a partition wall or a heat-transfer surface, the components included in these attached matters adhere to the partition wall, the heat-transfer surface, or the pipe, and then grow to narrow or choke a flow path, which is an obstacle to the operation. By adopting the direct-heating method, it is possible to suppress the adhesion of the tar and the condensed water, and thus it is difficult for the obstacle to the operation to occur since the area or the capacity of the heat-transfer surface where the temperature is apt to drop can be reduced, and the length of the pipe can also be decreased.

Therefore, the heat-transfer efficiency is high compared to when using other heat-transfer media, and it is possible to reduce the heat transfer area or the capacity of the pyrolysis device 11. Further, the heat is hard to be released and the thermal efficiency is high because the heat transfer is directly performed. Further, the pyrolysis gas (the gas generated from the dried biomass 2) generated in the pyrolysis device 11 is fed to the combustion device 13 together with the exhaust gas 6a as the mixed gas 7, and is then combusted. Therefore, the use of other fuels can be reduced in the combustion device 13, and thus, the fuel cost can be reduced.

It is preferable to use a combustor adopting the catalytic combustion method (hereinafter described as a "catalytic combustor") as the combustion device 13 of the manufacturing device according to the first embodiment. In the catalytic combustor, a catalytic component supported on the surface promotes the combustion reaction. Therefore, when using the catalytic combustor as the combustion device 13, stable combustion is easily maintained even if the calorific value of the fuel is low as in the case of the mixed gas 7 supplied from the pyrolysis device 11. Further, it is known that in general, the catalytic component of the catalyst vaporizes or reacts and thus the activity is degraded when the temperature rises to a high level equal to or higher than 1000° C. In the manufacturing device and the manufacturing method according to the present embodiment, a high-temperature part equal to or higher than 1000° C. is hard to be generated on the surface of the catalyst since the mixed gas 7 including the exhaust gas 6a and low in calorific value is combusted, and the catalytic component can be used for a long period of time.

It is also possible to perform the combustion using a burner corresponding to a gas having a low calorific value without using the catalytic combustor as the combustion device 13.

It should be noted that, although a supplying equipment related to the transportation of the solid materials, a damper used for regulating the flow rate of the gas components, and so on are omitted in the manufacturing device according to the first embodiment shown in FIG. 1, it is obvious that these devices are actually installed to regulate the transportation amount of the solid materials and the flow rate of the gas components. Further, although not shown in FIG. 1, it is also possible to provide a system for supplying the fuel for starting or supporting the combustion to the combustion device.

Further, the pyrolysis temperature in the pyrolysis device 11 is generally in a range of about 250 to 350° C., at which the fiberous materials in the biomass can be decomposed. The pyrolysis temperature varies depending on the aspect of the raw biomass 1 and the aspect required to the semi-carbonized pellet fuel 5 as a product.

Second Embodiment

Hereinafter, a device for manufacturing a semi-carbonized fuel of a biomass according to the second embodiment of the present invention will be described.

Figure 2:
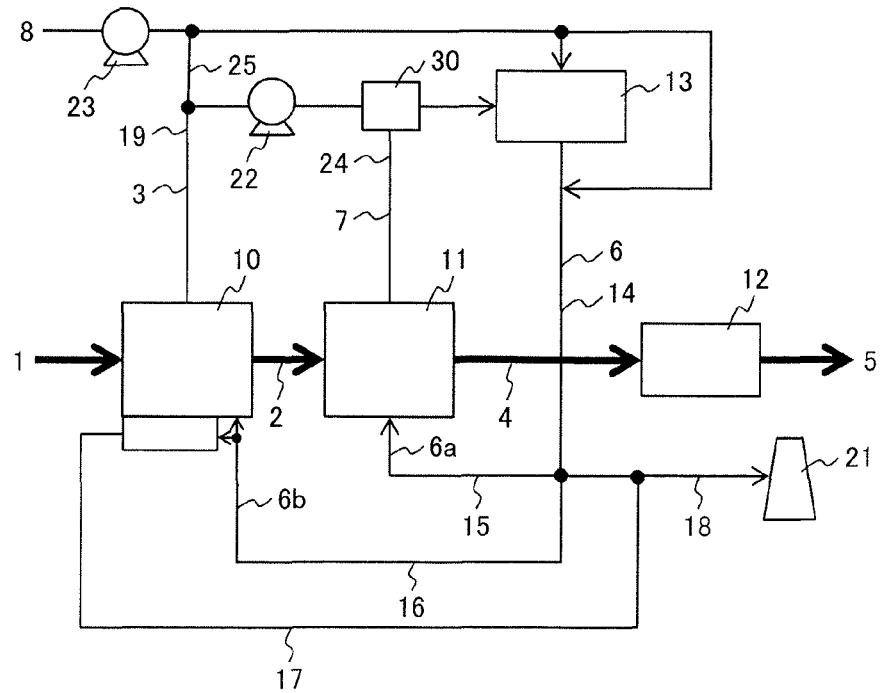
FIG. 2 is a configuration diagram of a device for manufacturing a semi-carbonized fuel of a biomass according to a second embodiment of the present invention.

FIG. 2 is a configuration diagram of the device for manufacturing the semi-carbonized fuel of the biomass according to the second embodiment. In FIG. 2, the same reference characters as in FIG. 1 denote the elements same as or common to those of the first embodiment, and the explanation regarding these elements will be omitted. In FIG. 2, out of the lines connecting the devices, thick lines also indicate the flow of the solid materials originating from the raw biomass, and thin lines also indicate the flow of the gas components such as air or the exhaust gas. Further, the supplying equipment related to the transportation of the solid materials, the damper used to regulate the flow rate of the gas components, and so on are omitted in FIG. 2. Although not shown in FIG. 2, it is also possible to provide a system for supplying the fuel for starting or supporting the combustion to the combustion device.

The different of the present embodiment from the first embodiment is that an ejector device 30 is disposed in the duct connecting the pyrolysis device 11 and the combustion device 13 and is used for supplying the combustion device 13 with the mixed gas 7 discharged from the pyrolysis device 11. The ejector device 30 is a device for generating a high-speed airflow inside to thereby induce low pressure due to the Bernoulli's principle, and drawing a gas using the low pressure. As a drive source of the ejector device 30, the air for combustion 8 or the separated gas in drying 3 is used, which are raised in pressure by the air blower 22. It is also possible to use either one of the air for combustion 8 and the separated gas in drying 3 as the drive source, or to use both of the air for combustion 8 and the separated gas in drying 3 as the drive source.

In the ejector device 30, the air for combustion 8 or the separated gas in drying 3 raised in pressure blow out as the high-speed airflow, and suck in the mixed gas 7. Mixing of the air for combustion 8 and the mixed gas 7 is promoted in such a manner as described above, and the air for combustion 8 and the mixed gas 7 are supplied to the combustion device 13 as a gas including the air and the fuel mixed homogenously. Therefore, in the combustion device 13, it is difficult to form a localized high-temperature part or a localized low-temperature part due to an uneven distribution of the fuel. Therefore, generation of nitrogen oxide originating from nitrogen in the air, which is apt to occur in the high-temperature part, and generation of unburnt carbon monoxide, which is apt to occur in the low-temperature part can be suppressed.

Further, by using the ejector device 30, it is possible to feed the mixed gas 7 to the combustion device 13 without including a rotating section such as an air blower. Therefore, there is the mixed gas 7 does not contact a solid substance, except the partition wall constituting the flow path (the duct 24) and the ejector device 30.

A part of the components of the pyrolysis gas of the biomass in the mixed gas 7 are low in vapor pressure and are condensed into a liquid or a solid, namely so-called tar or condensed water as the temperature drops. When the tar or the condensed water adheres to the partition wall and so on, there occurs an obstacle to the operation of the manufacturing device, such as narrowing or choke of the flow path. In particular, when the tar adheres to the rotating section such as the air blower, a vibration is generated. Further, the rotating section generally needs to be cooled, and therefore, a special cooling mechanism is necessary to flow the mixed gas with the temperature of about 300° C.

In the manufacturing device according to the present embodiment, no rotating section is required in the flow path of the mixed gas 7 since the ejector device 30 is used. Therefore, it is possible to inhibit the tar or the condensed water from adhering to the manufacturing device by keeping the partition wall constituting the flow path and the ejector device warm to thereby prevent the tar and the condensed water from adhering to the partition wall. Therefore, it is possible to operate the manufacturing device without stopping it for a long period of time to remove the attached matters, such as the tar and the condensed water.

Third Embodiment

Hereinafter, a device for manufacturing a semi-carbonized fuel of a biomass according to the third embodiment of the present invention will be described.

Figure 3:
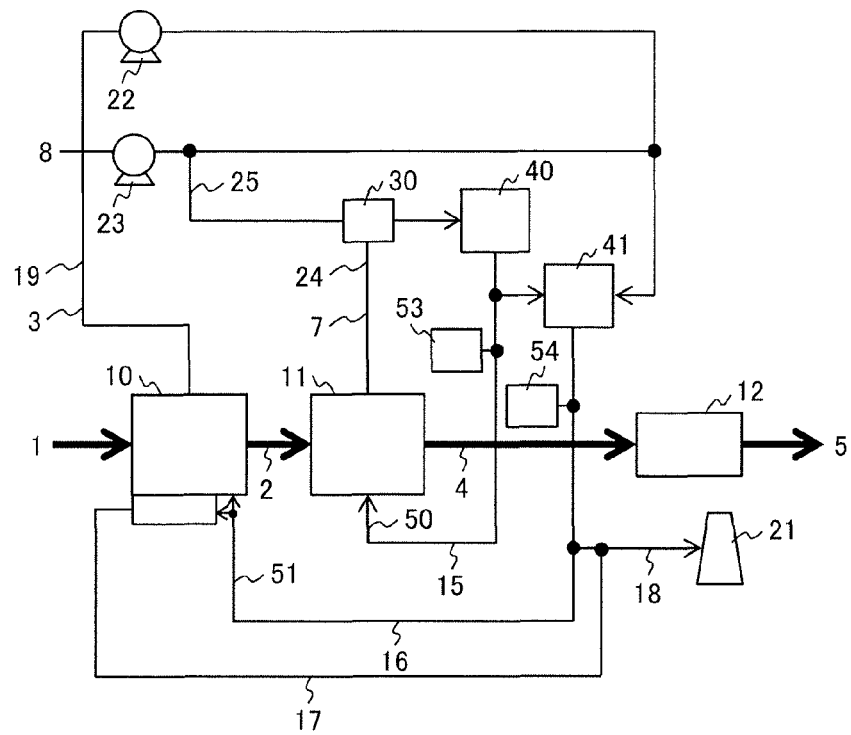
FIG. 3 is a configuration diagram of a device for manufacturing a semi-carbonized fuel of a biomass according to a third embodiment of the present invention.

FIG. 3 is a configuration diagram of the device for manufacturing the semi-carbonized fuel of the biomass according to the third embodiment. In FIG. 3, the same reference characters as in FIG. 2 denote the elements same as or common to those of the second embodiment, and the explanation regarding these elements will be omitted. In FIG. 3, out of the lines connecting the devices, thick lines also indicate the flow of the solid materials originated from the raw biomass, and thin lines also indicate the flow of the gas components such as air or the exhaust gas. Further, the supplying equipment related to the transportation of the solid materials, the damper used to regulate the flow rate of the gas components, and so on are omitted in FIG. 3. Although not shown in FIG. 3, it is also possible to provide a system for supplying the fuel for starting or supporting the combustion to the combustion device.

The different of the present embodiment from the second embodiment is that the manufacturing device includes plural combustion devices. As shown in FIG. 3, the manufacturing device according to the present embodiment includes two combustion devices 40, 41. The combustion device 41 is disposed on the downstream side of the combustion device 40 with respect to the flow of the exhaust gas. Further, the manufacturing device according to the present embodiment includes two gas analyzers 53, 54. The gas analyzer 53 is disposed on the duct 15 for feeding an exhaust gas 50 discharged from the combustion device 40, and the gas analyzer 54 is disposed on the duct 16 for feeding an exhaust gas 51 discharged from the combustion device 41.

The combustion device 40 combusts the mixed gas 7 and the air for combustion 8 supplied from the ejector device 30, and discharges the exhaust gas 50. A part of the exhaust gas 50 is supplied to the pyrolysis device 11, and the rest of the exhaust gas 50 is supplied to the combustion device 41.

The combustion device 41 combusts a part of the exhaust gas 50 supplied from the combustion device 40 and the air for combustion 8 supplied by the air blower 23, and discharges the exhaust gas 51. A part of the exhaust gas 51 is supplied to the drying device 10, and the remaining part of the exhaust gas 51 is discharged from the chimney 21 to the outside of the manufacturing device. Further, the combustion device 41 is supplied with the separated gas in drying 3 from the drying device 10 via the air blower 22.

The gas analyzers 53, 54 measure the oxygen concentration of the exhaust gases 50, 51, respectively. Based on the measured oxygen concentration of the exhaust gases 50, 51, the flow rate of the air for combustion 8 into the combustion devices 40, 41 can be regulated, respectively.

The exhaust gas 50 from the combustion device 40 is set to have the oxygen concentration lower than that of the exhaust gas 51 from the combustion device 41. In other words, the exhaust gas 50 supplied to the pyrolysis device 11 is set to have the oxygen concentration lower than that of the exhaust gas 51 supplied to the drying device 10. It is desirable for the oxygen concentration to be set to 0 to 2% in the exhaust gas 50 and 3 to 8% in the exhaust gas 51 so that the oxygen concentrations have difference of 1% or higher between the exhaust gas 50 and the exhaust gas 51. The oxygen concentrations of the exhaust gas 50 and the exhaust gas 51 are controlled by the amount of the air for combustion 8 supplied by the air blower 23.

The exhaust gas 50 low in oxygen concentration has a small amount of surplus air, and is relatively high in temperature. Therefore, the temperature suitable for the pyrolysis device 11, which needs to perform the pyrolysis at a temperature of about 300° C., is obtained. Further, since the oxygen concentration is low, the obstacle to the operation rarely occurs due to spontaneous combustion inside the pyrolysis device 11 and so on.

The exhaust gas 51, which is higher in oxygen concentration, is mixed with a large amount of air, includes a large amount of gas, and is relatively low in temperature. Therefore, the drying device 10 can be supplied with a large amount of gas low in temperature. Further, the decrease in temperature of the exhaust gas 51 due to the heat transfer can be reduced while inhibiting the localized high-temperature part from occurring inside the drying device 10. Therefore, the separated gas in drying 3 can be inhibited from being condensed again into the moisture at the low-temperature part inside the drying device 10. When the condensed moisture is generated in the drying device 10, there is a possibility that the dried biomass 2 adheres to each other to thereby hinder the operation. However, in the device configuration according to the present embodiment, the possibility is decreased.

Further, the exhaust gas discharged outside the manufacturing device from the chimney 21 is the exhaust gas 51 higher in oxygen concentration. The unburnt combustible content included in the exhaust gas 51 is apt to react with oxygen and is decreased by reacting with oxygen. Therefore, the unburnt combustible content in the exhaust gas to be discharged outside the manufacturing device from the chimney 21 can be reduced.

Since the separated gas in drying 3 discharged from the drying device 10 includes a large amount of moisture, the combustion temperature is lowered. The separated gas in drying 3 is supplied to the combustion device 41, but is not supplied to the combustion device 40. Therefore, the temperature of the exhaust gas 50, which is generated in the combustion device 40 and then supplied to the pyrolysis device 11 and the combustion device 41, is high. Therefore, the exhaust gas 50 high in temperature can be supplied to the pyrolysis device 11, and at the same time, the treatment of the odor component in the separated gas in drying 3 is possible in the combustion device 41.

In the case of using the catalytic combustor for the combustion devices 40, 41, it is desirable to use the catalysis high in heat resistance and capable of operating at a high temperature for the combustion device 40, and to use the catalysis high in steam resistance and prepared for the gas including a large amount of steam for the combustion device 41. Specifically, it is desirable to use the catalysis usable at a temperature of 800° C. or higher for the combustion device 40, and to use the catalysis usable on the condition that the mass ratio of the steam amount to the overall gas amount is 5% or higher for the combustion device 41.

Figure 4:
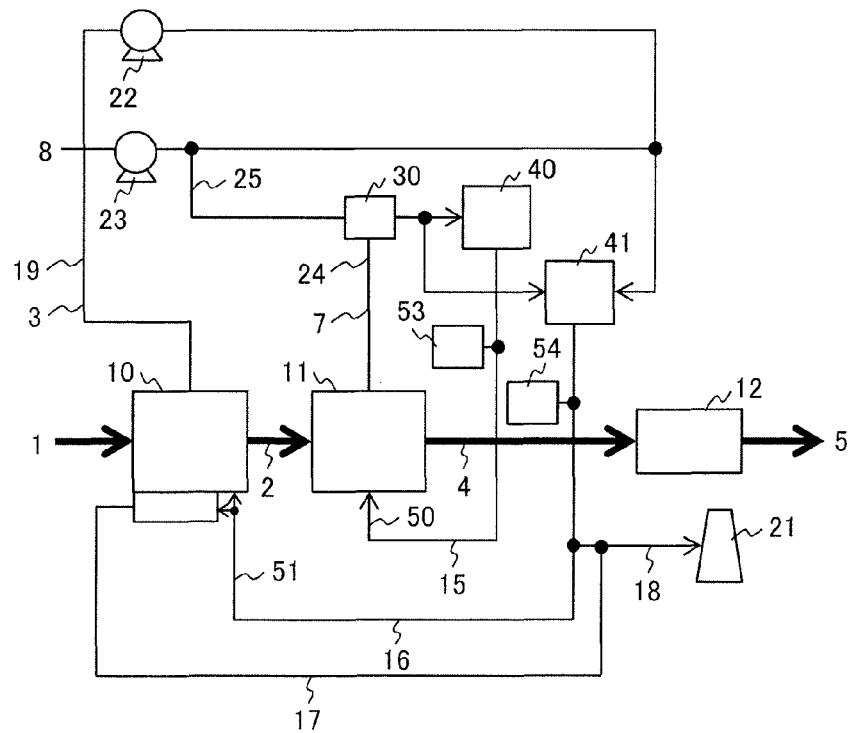
FIG. 4 is a configuration diagram of a modified device for manufacturing a semi-carbonized fuel of a biomass according to the third embodiment of the present invention.

FIG. 4 is a configuration diagram of a modified device for manufacturing the semi-carbonized fuel of the biomass according to the present embodiment. In FIG. 4, the same reference characters as in FIG. 3 denote the same elements as in FIG. 3, and the explanation regarding these elements will be omitted. In the manufacturing device shown in FIG. 3, a part of the exhaust gas 50 from the combustion device 40 is supplied to the combustion device 41. As in the manufacturing device shown in FIG. 4, it is also possible to branch the mixed gas 7 from the pyrolysis device 11 at the downstream of the ejector device 30 and supply the branched mixed gas 7 individually to the combustion devices 40, 41.

By branching the mixed gas 7 and then supplying the branched mixed gas 7 individually to the combustion devices 40, 41 as shown in FIG. 4, the calorific value of the combustion gas (the mixed gas 7) entering the combustion device 41 is higher than that of the manufacturing device having the configuration shown in FIG. 3. Therefore, when the catalytic combustor is not used for the combustion device 41 and the combustion is performed using a burner, if the configuration shown in FIG. 4 is adopted, it is easy to maintain the stable combustion since the localized combustion temperature rises in the combustion device 41.

On the other hand, in the case of using the catalytic combustor for the combustion device 41, it is preferable to use a part of the exhaust gas 50 from the combustion device 40 as the combustion gas in the combustion device 41 as in the configuration shown in FIG. 3. It is desirable for maintaining the durability of the catalysis because the combustion gas (a part of the exhaust gas 50) entering the combustion device 41 is low in calorific value, the localized high-temperature part is hard to occur in the combustion device 41, and the combustion temperature is smoothed.

The manufacturing devices shown in FIGS. 3 and 4 include two combustion devices 40, 41. The number of the combustion devices is not limited to two and can be three or more. As an example, a manufacturing device including three combustion devices is shown in FIG. 5.

Figure 5:
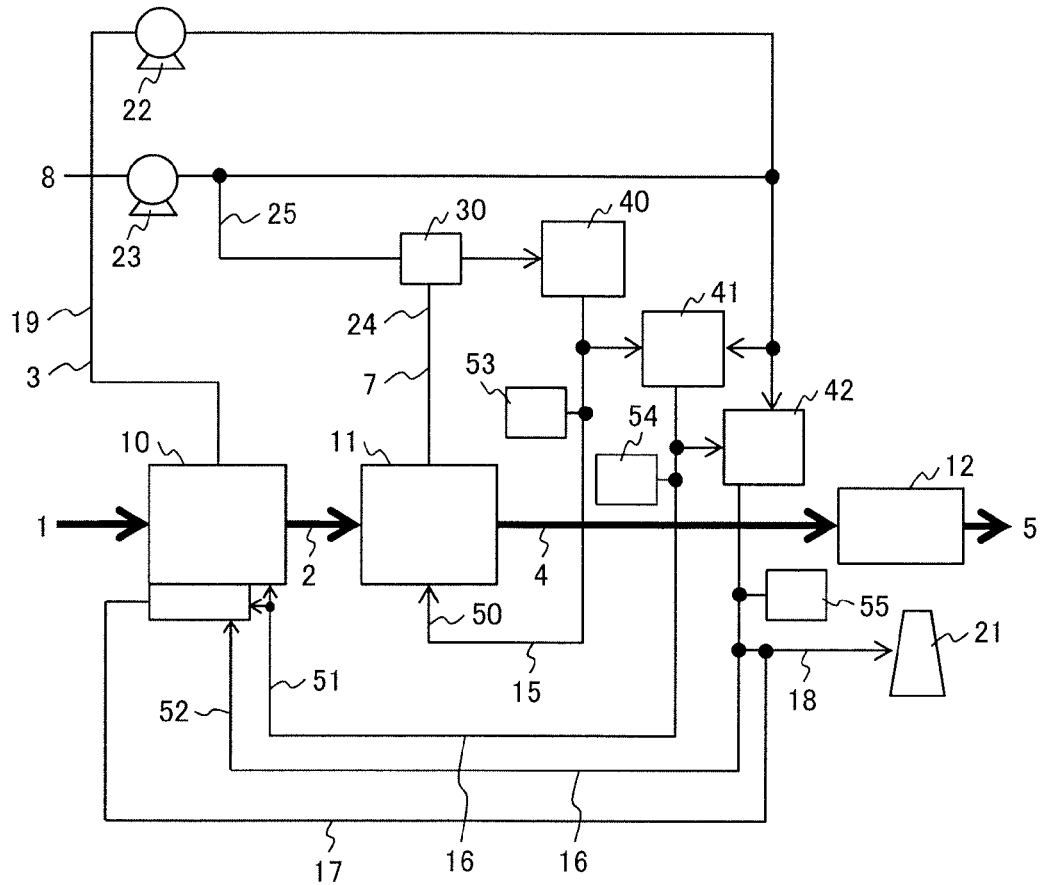
FIG. 5 is a configuration diagram of another modified device for manufacturing a semi-carbonized fuel of a biomass according to the third embodiment of the present invention.

FIG. 5 is a configuration diagram of another modified device for manufacturing the semi-carbonized fuel of the biomass according to the present embodiment. In FIG. 5, the same reference characters as in FIG. 3 denote the same elements as in FIG. 3, and the explanation regarding these elements will be omitted. The manufacturing device shown in FIG. 5 includes three combustion devices 40, 41, and 42. The combustion device 41 is disposed on the downstream side of the combustion device 40 with respect to the flow of the exhaust gas, and the combustion device 42 is disposed on the downstream side of the combustion device 41. Further, the manufacturing device shown in FIG. 5 includes three gas analyzers 53, 54, and 55. The gas analyzer 53 is disposed on the duct 15 for feeding the exhaust gas 50 discharged from the combustion device 40, the gas analyzer 54 is disposed on the duct 16 for feeding the exhaust gas 51 discharged from the combustion device 41, and the gas analyzer 55 is disposed on the duct 16 for feeding an exhaust gas 52 discharged from the combustion device 42.

The combustion device 42 combusts a part of the exhaust gas 51 supplied from the combustion device 41 and the air for combustion 8 supplied by the air blower 23, and discharges the exhaust gas 52. A part of the exhaust gas 51 is supplied to the inside of the drying device 10. A part of the exhaust gas 52 is supplied to the outside of the drying device 10 and the remaining part of the exhaust gas 52 is discharged from the chimney 21 to the outside of the manufacturing device. Further, the combustion device 42 is supplied with the separated gas in drying 3 from the drying device 10 via the air blower 22.

The gas analyzers 53 to 55 measure the oxygen concentration of the exhaust gases 50 to 52, respectively. Based on the measured oxygen concentration of the exhaust gases 50 to 52, the flow rate of the air for combustion 8 into the combustion devices 40 to 42 can be regulated, respectively.

In the manufacturing device shown in FIG. 5, similarly to the manufacturing device shown in FIG. 3, the oxygen concentration of each of the exhaust gases 50 to 52 is set so that the exhaust gas high in oxygen concentration is discharged from the combustion devices located on the downstream side (the combustion devices 41, 42 for supplying the exhaust gas to the drying device 10). In other words, the exhaust gas 50 supplied to the pyrolysis device 11 is set to have the oxygen concentration lower than that of the exhaust gases 51, 52 supplied to the drying device 10. Thus, the exhaust gas 52 high in oxygen concentration is discharged from the combustion device 42, and the exhaust gas 52 can be discharged from the chimney 21 to the outside of the manufacturing device.

Even in the manufacturing device including four or more combustion devices, the combustion devices are installed similarly to FIGS. 3 to 5, and the oxygen concentration of the exhaust gas discharged from each of the combustion devices can be set. Therefore, it is possible to set the oxygen concentration of the exhaust gas supplied to the pyrolysis device 11 so as to be lower than the oxygen concentration of the exhaust gas supplied to the drying device 10 to thereby arrange that the exhaust gas high in oxygen concentration is discharged from the combustion devices located on the downstream side (the combustion devices for supplying the exhaust gas to the drying device 10).

By disposing the plurality of combustion devices, setting the oxygen concentration of the exhaust gas discharged from each of the combustion devices, and discharging the exhaust gas high in oxygen concentration from the chimney 21 to the outside of the manufacturing device, it is possible to promote the reaction of the unburnt combustible content in the exhaust gas and oxygen to thereby reduce the unburnt combustible content discharged to the outside of the manufacturing device.

In FIGS. 3 to 5, the cases are explained in which the oxygen concentration in the exhaust gas is measured by the gas analyzers 53 to 54, and the flow rate of the air for combustion 8 is controlled based on the measured oxygen concentration. It should be noted that it is also possible to provide a difference of the oxygen concentrations between output ports of the combustion devices without using the gas analyzers.

For example, it is possible to measure the flow rate of the air for combustion 8, the mixed gas 7, the exhaust gas 50, and so on entering the combustion devices, and provide a difference of the flow rates between the combustion devices. Further, in the case of introducing a part of the exhaust gas 50 from the combustion device 40 to the combustion device 41 as shown in FIG. 3, for example, the oxygen concentration of the exhaust gas 51 is higher than the oxygen concentration of the exhaust gas 50 because the air for combustion 8 is mixed in the combustion device 41. Therefore, by controlling the flow rate ratio between the exhaust gas 50 and the air for combustion 8 entering the combustion device 41, a difference of the oxygen concentrations can be set between the exhaust gases 50, 51 from the combustion devices 40, 41.

Forth Embodiment

Hereinafter, a power generation system using a semi-carbonized fuel according to an embodiment of the present invention will be described.

Figure 6:
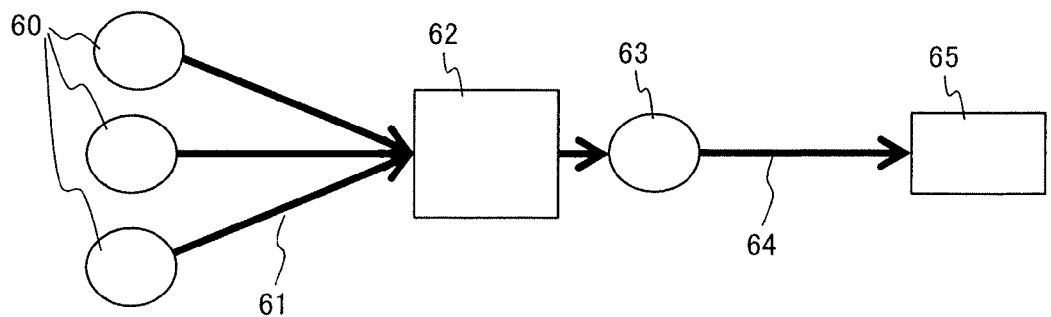
FIG. 6 is a configuration diagram of a power generation system according to an embodiment of the present invention.

FIG. 6 is a configuration diagram of the power generation system according to the present embodiment. The power generation system includes a manufacturing device 62 of the semi-carbonized fuel of the biomass, and a power generation plant 65. The manufacturing device 62 is a device for manufacturing a semi-carbonized fuel of a biomass according to the invention. The power generation plant 65 uses a solid fuel including a semi-carbonized fuel manufactured by the manufacturing device 62 as a fuel.

Biomass 60 is collected in the manufacturing device 62 using collection means 61 such as a truck. The manufacturing device 62 pyrolytically decomposes the biomass 60 to manufacture semi-carbonized fuel 63. On this occasion, the semi-carbonized fuel 63 is more difficult to fly apart than one in a powdered state and the handling ability of the semi-carbonized fuel 63 is enhanced as the fuel when the semi-carbonized fuel 63 is compressed in a pellet shape with a diameter of about 1 cm.

The semi-carbonized fuel 63 is transported to the power generation plant 65 using transportation means 64 such as a ship. In the power generation plant 65, the semi-carbonized fuel 63 is used as a fuel for the power generation together with coal or the like.

In the power generation system using the semi-carbonized fuel according to the embodiment of the present invention, the usage of coal can be reduced by using the semi-carbonized fuel 63. Since the semi-carbonized fuel 63 is derived from the biomass and $CO_2$ derived from the biomass is fixed again by plants, the semi-carbonized fuel 63 can be deemed $CO_2$ free. Further, the emission of $CO_2$ can be reduced from the power generation plant due to simplification of the treatment of wastes and reduction in the usage of coal.

EXPLANATION OF REFERENCE CHARACTERS

1 raw biomass
2 dried biomass
3 separated gas in drying
4 semi-carbonized fuel
5 semi-carbonized pellet fuel
6, 6a, 6b exhaust gas (combustion exhaust gas)
7 mixed gas (mixed gas of a pyrolysis gas and the exhaust gas)
8 air for combustion
10 drying device
11 pyrolysis device
12 pellet manufacturing device
13 combustion device
14 to 19, 24, 25 duct
20, 22, 23 air blower
21 chimney
30 ejector device
40, 41, 42 combustion device
50, 51, 52 exhaust gas
53, 54, 55 gas analyzer
60 biomass
61 collection means
62 device for manufacturing a semi-carbonized fuel of a biomass
63 semi-carbonized fuel
64 transportation means
65 power generation plant

What is claimed is:

1. A method for manufacturing a semi-carbonized fuel of a biomass, the method comprising:
    a drying step to heat and dry the biomass;
    a pyrolysis step to pyrolytically decompose the biomass dried by the drying step; and
    a combustion step to generate heat used in the drying step and the pyrolysis step, wherein
        in the pyrolysis step, a part of a combustion exhaust gas generated in the combustion step is directly mixed with the biomass to heat and pyrolytically decompose the biomass, and a generated pyrolysis gas and the combustion exhaust gas used for heating are mixed to generate a mixed gas;
        in the combustion step, an air for combustion and the mixed gas are combusted, a part of the generated combustion exhaust gas is used in the pyrolysis step, and a remainder of the generated combustion exhaust gas is used in the drying step,
        an oxygen concentration of the combustion exhaust gas used in the pyrolysis step is set to be lower than an oxygen concentration of the combustion exhaust gas used in the drying step, and
        in the diving step a part of the combustion exhaust gas generated in the combustion device is supplied in the drying step there is a direct mixing of a part of the supplied combustion exhaust gas and the biomass, in the drying step
        a remainder of the supplied combustion exhaust gas exchanges heat with the biomass by indirect heat transfer, and in the drying step a generated gas is supplied to the combustion step.

2. A power generation system using a semi-carbonized fuel as a fuel, the semi-carbonized fuel manufactured by the method for manufacturing a semi-carbonized fuel of a biomass according to claim 1.

3. A device for manufacturing a semi-carbonized fuel of a biomass comprising:
    a drying device configured to heat and dry a biomass;
    a pyrolysis device configured to pyrolytically decompose the biomass dried by the drying device; and
    a combustion device configured to supply heat to the drying device and the pyrolysis device for heating, wherein
        the pyrolysis device is configured to be supplied with a part of a combustion exhaust gas generated in the combustion device, directly mix the supplied combustion exhaust gas and the biomass to heat and pyrolytically decompose the biomass, and supply a mixed gas of a generated pyrolysis gas and the combustion exhaust gas used for heating to the combustion device,
        the combustion device is configured to be supplied with an air for combustion, combust the supplied mixed gas, and generate the combustion exhaust gas, and
        the drying device is supplied with a part of the combustion exhaust as generated in the combustion device, directly mixes a part of the supplied combustion exhaust gas and the biomass, makes a remainder of the supplied combustion exhaust gas exchange heat with the bioniass by indirect heat transfer, and supplies a generated gas to the combustion device.

4. The device for manufacturing a semi-carbonized fuel of a biomass according to claim 3,
    wherein a combustor including a catalytic component supported on a surface of the combustor is used for the combustion device.

5. The device for manufacturing a semi-carbonized fuel of a biomass according to claim 4, further comprising:
    an ejector device configured to supply the mixed gas from the pyrolysis device to the combustion device;
    wherein the ejector device uses at least one of a gas generated in the drying device and the air for combustion as a drive source.

6. The device for manufacturing a semi-carbonized fuel of a biomass according to claim 4, comprising:
    a plurality of the combustion devices;
    wherein each of the combustion devices is supplied with the mixed gas and the air for combustion; and
    the combustion exhaust gas generated in a part of the combustion devices is supplied to the pyrolysis device, and the combustion exhaust gas generated in a remainder of the combustion devices is supplied to the drying device.

7. The device for manufacturing a semi-carbonized fuel of a biomass according to claim 4, comprising:
    a plurality of the combustion devices;
    wherein the plurality of combustion devices are supplied with the combustion exhaust gas from the combustion device located on an upstream side of the respective combustion devices with respect to a flow of the exhaust gas, and supplies the combustion exhaust gas to the combustion device located on an downstream side of the respective combustion devices;
    the combustion device located on an uppermost stream side is supplied with the mixed gas and the air for combustion, and supplies a part of the combustion exhaust gas to the pyrolysis device; and the combustion device located on a downstream side of the combustion device located on the uppermost stream side is supplied with the air for combustion, and supplies a part of the combustion exhaust gas to the drying device.

8. The device for manufacturing a semi-carbonized fuel of a biomass according to claim 3, further comprising:

an ejector device configured to supply the mixed gas from the pyrolysis device to the combustion device;

wherein the ejector device uses at least one of a gas generated in the drying device and the air for combustion as a drive source.

9. The device for manufacturing a semi-carbonized fuel of a biomass according to claim 8, comprising:

a plurality of the combustion devices;

wherein each of the combustion devices is supplied with the mixed gas and the air for combustion; and the combustion exhaust gas generated in a part of the combustion devices is supplied to the pyrolysis device, and the combustion exhaust gas generated in a remainder of the combustion devices is supplied to the drying device.

10. The device for manufacturing a semi-carbonized fuel of a biomass according to claim 8, comprising:

a plurality of the combustion devices;

wherein the plurality of combustion devices are supplied with the combustion exhaust gas from the combustion device located on an upstream side of the respective combustion devices with respect to a flow of the exhaust gas, and supplies the combustion exhaust gas to the combustion device located on an downstream side of the respective combustion devices;

the combustion device located on an uppermost stream side is supplied with the mixed gas and the air for combustion, and supplies a part of the combustion exhaust gas to the pyrolysis device; and the combustion device located on a downstream side of the combustion device located on the uppermost stream side is supplied with the air for combustion, and supplies a part of the combustion exhaust gas to the drying device.

11. The device for manufacturing a semi-carbonized fuel of a biomass according to claim 3, comprising:

a plurality of the combustion devices;

wherein each of the combustion devices is supplied with the mixed gas and the air for combustion; and the combustion exhaust gas generated in a part of the combustion devices is supplied to the pyrolysis device, and the combustion exhaust gas generated in a remainder of the combustion devices is supplied to the drying device.

12. The device for manufacturing a semi-carbonized fuel of a biomass according to claim 11, wherein a combustor including a catalytic component supported on a surface of the combustor is used for each of the combustion devices;

the combustor including a catalysis usable at a temperature of 800° C. or more is used for the combustion device to supply the combustion exhaust gas to the pyrolysis device includes; and the combustor including a catalysis usable on a condition that a mass ratio of a steam amount to an overall gas amount is equal to or more than 5% is used for the combustion device to supply the combustion exhaust gas to the drying device.

13. The device for manufacturing a semi-carbonized fuel of a biomass according to claim 3, comprising:

a plurality of the combustion devices;

wherein the plurality of combustion devices are supplied with the combustion exhaust gas from the combustion device located on an upstream side of the respective combustion devices with respect to a flow of the exhaust gas, and supplies the combustion exhaust gas to the combustion device located on an downstream side of the respective combustion devices;

the combustion device located on an uppermost stream side is supplied with the mixed gas and the air for combustion, and supplies a part of the combustion exhaust gas to the pyrolysis device; and the combustion device located on a downstream side of the combustion device located on the uppermost stream side is supplied with the air for combustion, and supplies a part of the combustion exhaust gas to the drying device.

14. The device for manufacturing a semi-carbonized fuel of a biomass according claim 13, wherein a combustor including a catalytic component supported on a surface of the combustor is used for each of the combustion devices;

the combustor including a catalysis usable at a temperature of 800° C. or more is used for the combustion device to supply the combustion exhaust gas to the pyrolysis device includes; and the combustor including a catalysis usable on a condition that a mass ratio of a steam amount to an overall gas amount is equal to or more than 5% is used for the combustion device to supply the combustion exhaust gas to the drying device.

15. A power generation system using a semi-carbonized fuel as a fuel, the semi-carbonized fuel manufactured by the device for manufacturing a semi-carbonized fuel of a biomass according to claim 3.

\* \* \* \* \*